United States Patent
Zhu et al.

(10) Patent No.: US 11,606,776 B2
(45) Date of Patent: Mar. 14, 2023

(54) TRANSMISSION METHOD AND APPARATUS THEREOF

(71) Applicant: HUAWEI TECHNOLOGIES CO., LTD., Guangdong (CN)

(72) Inventors: Jun Zhu, Shenzhen (CN); Qiong Jia, Shanghai (CN); Weiwei Fan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/746,507

(22) Filed: Jan. 17, 2020

(65) Prior Publication Data

US 2020/0154399 A1 May 14, 2020

Related U.S. Application Data

(63) Continuation of application No. PCT/CN2018/095999, filed on Jul. 17, 2018.

(51) Int. Cl.
*H04W 72/02* (2009.01)
*H04W 72/04* (2009.01)
(Continued)

(52) U.S. Cl.
CPC ......... *H04W 72/02* (2013.01); *H04W 72/042* (2013.01); *H04W 72/0453* (2013.01);
(Continued)

(58) Field of Classification Search
CPC ............. H04W 72/02; H04W 72/0413; H04W 72/042; H04W 72/0453; H04W 74/006; H04W 74/0808
See application file for complete search history.

(56) References Cited

U.S. PATENT DOCUMENTS

2016/0278074 A1  9/2016  Yang et al.
2017/0013479 A1*  1/2017  Sun ................ H04W 28/0236
(Continued)

FOREIGN PATENT DOCUMENTS

CN  101827425 A  9/2010
CN  105101300 A  11/2015
(Continued)

OTHER PUBLICATIONS

Intel Corporation,"Uplink transmission for LAA",3GPP TSG-RAN WG—Meeting#90 R2-152214,Fukuoka, Japan, May 25-29, 2015,total 6 pages.
(Continued)

*Primary Examiner* — Kevin C. Harper
(74) *Attorney, Agent, or Firm* — Womble Bond Dickinson (US) LLP

(57) ABSTRACT

Embodiments of this application disclose a transmission method and an apparatus thereof. The method includes the following operations: performing, by a terminal device, idle state sensing on one or more candidate transmission frequency domain resources, where the one or more candidate transmission frequency domain resources are configured for PUCCH information transmission; determining, by the terminal device based on a sensing result of the one or more candidate transmission frequency domain resources, a transmission frequency domain resource from the one or more candidate transmission frequency domain resources for PUCCH information transmission; and transmitting, by the terminal device, the PUCCH information by using the determined transmission frequency domain resource. By using the embodiments of this application, uplink transmission can be implemented by using an unlicensed frequency spectrum, and transmission efficiency can be improved.

17 Claims, 9 Drawing Sheets

(51) Int. Cl.
*H04W 74/08* (2009.01)
*H04W 74/00* (2009.01)
*H04W 72/0453* (2023.01)
*H04W 88/06* (2009.01)

(52) U.S. Cl.
CPC ..... *H04W 74/006* (2013.01); *H04W 74/0808* (2013.01); *H04W 72/0413* (2013.01); *H04W 88/06* (2013.01)

(56) References Cited

U.S. PATENT DOCUMENTS

| | | | |
|---|---|---|---|
| 2017/0223676 A1* | 8/2017 | Dinan | H04W 72/042 |
| 2017/0223738 A1 | 8/2017 | Seo et al. | |
| 2018/0343154 A1* | 11/2018 | Park | H04L 5/0007 |
| 2019/0110307 A1* | 4/2019 | Kim | H04W 72/1268 |
| 2019/0200349 A1* | 6/2019 | Harada | H04W 72/0413 |

FOREIGN PATENT DOCUMENTS

| | | | |
|---|---|---|---|
| CN | 105848165 A | 8/2016 | |
| CN | 106470485 A | 3/2017 | |
| JP | 2014513458 A | 5/2014 | |
| JP | 2016-176859 * | 9/2016 | ............ H04W 72/00 |
| WO | 2016043523 A1 | 3/2016 | |
| WO | 2017070055 A1 | 4/2017 | |
| WO | 2017104644 A1 | 6/2017 | |

OTHER PUBLICATIONS

Intel Corporation, Transmission of Uplink Control Information on an LAA Scell [online], 3GPP TSG-RAN WG1#84b, R1-162357,total 7 pages.

Mediatek Inc. UCI transmission in eLAA[online] 3GPP TSG-RAN WG1#85,R1-165118,total 4 pages.

* cited by examiner

TRANSMISSION METHOD AND APPARATUS THEREOF

CROSS-REFERENCE TO RELATED APPLICATIONS

This application is a continuation of International Application No. PCT/CN2018/095999, filed on Jul. 17, 2018, which claims priority to Chinese Patent Application No. 201710586542.5, filed on Jul. 18, 2017. The disclosures of the aforementioned applications are hereby incorporated by reference in their entireties.

TECHNICAL FIELD

This application relates to the field of communications technologies, and in particular, to a transmission method and an apparatus thereof.

BACKGROUND

To improve development of wireless broadband, massive unlicensed frequency spectrum resources are opened globally. If the idle and free unlicensed frequency spectrum resources can be effectively used, pressure of frequency spectrum resources can be greatly relieved. For an operator, if an operating frequency band of the long term evolution (LTE) technology is extended to the unlicensed frequency band that has abundant resources and that is free, costs of obtaining a frequency spectrum resource is likely to be significantly reduced, a network is effectively offloaded, and network expansion pressure is reduced.

Because there is only one wireless system in each frequency band on a licensed frequency spectrum, and a communications system of another type cannot use the licensed frequency spectrum, a problem of frequency spectrum contention between different systems does not need to be considered, and communication between users can also be greatly ensured. A wireless communications system of another type, represented by an 802.11 system, works on the unlicensed frequency spectrum. That is, the frequency band is not dedicated to the 802.11 system, and another communications system can also use the unlicensed frequency spectrum. Therefore, for communication on the unlicensed frequency spectrum, problems of frequency spectrum contention between different systems and fairness need to be considered. A communications mechanism of the unlicensed frequency spectrum is greatly different from that of the licensed frequency spectrum.

In researches of the fifth-generation (5G) mobile communications system, a new radio transmission technology and a new system architecture are introduced, and new frequency spectrum resources are further explored, so that the 5G system can comprehensively exceed the LTE system in terms of resource utilization, a system throughput rate, and frequency spectrum resources. In the 5G system, how to perform uplink transmission by using the unlicensed frequency spectrum is a problem that urgently needs to be resolved.

SUMMARY

A technical problem to be resolved by embodiments of this application is to provide a transmission method and an apparatus thereof, so that uplink transmission can be implemented by using an unlicensed frequency spectrum, and transmission efficiency can be improved.

According to a first aspect, an embodiment of this application provides a transmission method, including:

Operation 1: A terminal device performs idle state sensing on one or more candidate transmission frequency domain resources, where the one or more candidate transmission frequency domain resources are configured for physical uplink control channel (PUCCH) information transmission.

Operation 2: The terminal device determines, based on a sensing result of the candidate transmission frequency domain resources, a transmission frequency domain resource from the one or more candidate transmission frequency domain resources for PUCCH information transmission.

Operation 3: The terminal device transmits the PUCCH information by using the determined transmission frequency domain resource.

According to a second aspect, an embodiment of this application provides a terminal device, including a unit or means (means) configured to perform each operation according to the foregoing first aspect.

According to a third aspect, an embodiment of this application provides a terminal device, including at least one processing element and at least one storage element, where the at least one storage element is configured to store a program and data, and the at least one processing element is configured to perform the method provided in the first aspect of this application.

According to a fourth aspect, an embodiment of this application provides a terminal device, including at least one processing element (or chip) configured to perform the method according to the first aspect.

According to a fifth aspect, an embodiment of this application provides a program. The program is used to perform the method according to the first aspect when executed by a processor.

According to a sixth aspect, an embodiment of this application provides a program product, such as a computer-readable storage medium, including the program according to the fifth aspect.

It can be learned that, according to the foregoing aspects, the terminal device performs idle state sensing on the one or more candidate transmission frequency domain resources to determine the transmission frequency domain resource used for PUCCH information transmission, where the one or more candidate transmission frequency domain resources may be unlicensed frequency domain resources, so that uplink transmission can be implemented by using an unlicensed frequency spectrum, and transmission efficiency can be improved.

In one embodiment, the one or more candidate transmission frequency domain resources may be presented in a form of a set. That is, one candidate transmission frequency domain resource set includes the one or more candidate transmission frequency domain resources.

In one embodiment, before performing Operation 1, the terminal device further performs an operation of determining the one or more candidate transmission frequency domain resources. When the one or more candidate transmission frequency domain resources are determined, the terminal device can perform idle state sensing on the one or more candidate transmission frequency domain resources.

In one embodiment, the terminal device receives PUCCH resource configuration information from a network device. The PUCCH resource configuration information is used to indicate the one or more candidate transmission frequency domain resources, and the terminal device determines the one or more candidate transmission frequency domain resources based on the PUCCH resource configuration information. This is a manner of directly indicating the one or more candidate transmission frequency domain resources by the network device by using the PUCCH resource configuration information, and is simple, direct, and easy to be implemented.

In one embodiment, the PUCCH resource configuration information is carried in downlink control information. That is, the network device indicates the one or more candidate transmission frequency domain resources to the terminal device by using the downlink control information.

In one embodiment, the PUCCH resource configuration information, apart from being used to indicate the one or more candidate transmission frequency domain resources, is further used to indicate location information of the candidate transmission frequency domain resources.

In one embodiment, the terminal device obtains a downlink transmission resource, and determines the one or more candidate transmission frequency domain resources based on the downlink transmission resource. The terminal device and the network device store a correspondence between the downlink transmission resource and the candidate transmission frequency domain resource set. That is, different downlink transmission resources may correspond to different candidate transmission frequency domain resource sets. When the downlink transmission resource is obtained, the terminal device determines the candidate transmission frequency domain resource set, to be specific, determines the one or more candidate transmission frequency domain resources, based on the correspondence between the downlink transmission resource and the candidate transmission frequency domain resource set. This is a manner of indirectly indicating the one or more candidate transmission frequency domain resources by the network device by using the downlink transmission resource without adding extra indication overheads.

In one embodiment, if the terminal device senses that one candidate transmission frequency domain resource is in an idle state, the terminal device determines the candidate transmission frequency domain resource as a transmission frequency domain resource used for PUCCH information transmission.

In one embodiment, if the terminal device senses that at least two candidate transmission frequency domain resources are in an idle state, the terminal device selects one candidate transmission frequency domain resource from the at least two candidate transmission frequency domain resources based on an identifier of the terminal device, and determines the selected candidate transmission frequency domain resource as a transmission domain resource used for PUCCH information transmission. For example, a quantity of candidate transmission frequency domain resources in an idle state is used to perform a modulo operation on the identifier of the terminal device, to select one candidate transmission frequency domain resource.

In one embodiment, if the terminal device senses that at least two candidate transmission frequency domain resources are in an idle state, the terminal device randomly selects one candidate transmission frequency domain resource from the at least two candidate transmission frequency domain resources, and determines the selected candidate transmission frequency domain resource as a transmission domain resource used for PUCCH information transmission.

In one embodiment, the terminal device determines all candidate transmission frequency domain resources in an idle state as transmission frequency domain resources used for PUCCH information transmission. Assuming that there are two candidate transmission frequency domain resources in an idle state, the terminal device transmits the PUCCH information on the two candidate transmission frequency domain resources. In this way, the network device does not need to perform blind detection, and directly combines and receives the PUCCH information on the two candidate transmission frequency domain resources.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

In the following, some terms in this application are described, to help a person skilled in the art have a better understanding.

(1) A terminal device, also referred to as user equipment (UE), a mobile station (MS), a mobile terminal (MT) or the like, is a device providing voice and/or data connectivity for a user, such as a handheld device or an in-vehicle device that has a wireless connection function. Currently, some examples of the terminal device include: a mobile phone (mobile phone), a tablet computer, a notebook computer, a palmtop computer, a mobile Internet device (MID), wearable equipment, a virtual reality (VR) device, an augmented reality (AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like.

(2) A radio access network (RAN) is a part that is in a network and that connects a terminal to a wireless network.

A RAN node (or device) is a node (or device) in the radio access network, and may also be referred to as a base station. Currently, some examples of the RAN node include: a gNB, a transmission reception point (TRP), an evolved NodeB (eNB), a radio network controller (RNC), a NodeB (NB), a base station controller (BSC), a base transceiver station (BTS), a home NodeB (for example, home evolved NodeB or home NodeB, HNB), a baseband unit (BBU), a station (STA), wireless fidelity (Wi-Fi), an access point (AP), and the like. In addition, in a network structure, the RAN may include a centralized unit (CU) node and a distributed unit (DU) node. In such a structure, a protocol layer of an eNB in an LTE system is split, some functions of the protocol layer are under the centralized control of the CU, and the remaining functions or all of the functions of the protocol layer are distributed in the DU, and the DU is under the centralized control of the CU.

(3) "A plurality of" refers to two or more, and other quantifiers are similar. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
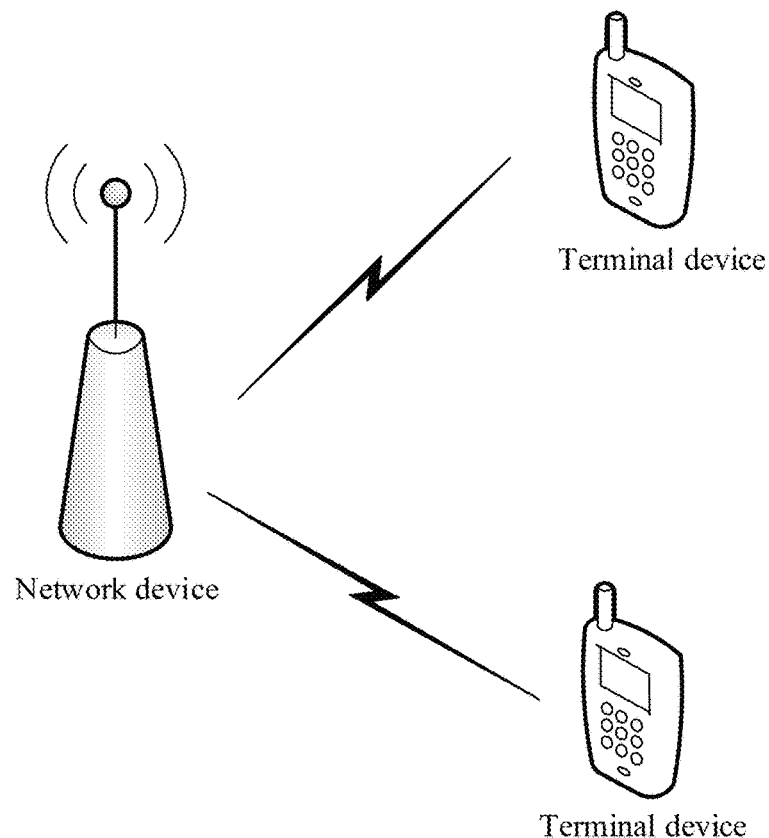
FIG. 1 is a schematic diagram of a network architecture according to an embodiment of this application.

FIG. 1 a schematic diagram of a network architecture according to an embodiment of this application. The network architecture may be a network architecture of a wireless communications system, and may include a terminal device and a network device. It should be noted that, quantities and forms of the terminal devices and network devices shown in FIG. 1 are not limitations to embodiments of this application. In an actual application, one network device may be connected to a plurality of terminal devices. The network device may be connected to a core network device, and the core network device is not shown in FIG. 1. The network device may be a base station, and the base station may include a BBU and a remote radio unit (RRU). The BBU and the RRU may be placed at different locations. For example, the RRU is remotely placed in a spacious area with a high traffic volume, and the BBU is placed in a central equipment room. The BBU and the RRU may alternatively be placed in a same equipment room. The BBU and the RRU may alternatively be different components on one rack.

It should be noted that, the wireless communications system mentioned in embodiments of this application includes, but is not limited to: a narrow band internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronization code division multiple access (TD-SCDMA) system, a LTE system, a fifth-generation mobile communications system, and a future mobile communications system.

In the embodiments of the present invention, a network device is an apparatus deployed in a radio access network and configured to provide a wireless communication function for user equipment. The network device may include a macro base station, a micro base station (also referred to as a small cell), a relay station, an access point, a TRP, and the like that are in various forms. In systems using different radio access technologies, a device having a function of the base station may be named differently. For example, the device is referred to as an eNB or eNodeB in an LTE system, and referred to as an NB or the like in a 3rd generation (3G) system. For ease of description, in all the embodiments of this application, all the foregoing apparatuses that provide a wireless communication function for the user device are referred to as a network device.

The terminal device in the embodiments of this application may include various handheld devices, vehicle-mounted devices, wearable devices, or computing devices that have a wireless communication function, or other processing devices connected to a wireless modem. For ease of description, in all embodiments of this application, user equipment connected to the network devices are collectively referred to as a terminal device.

A network device transmits downlink data to a terminal device, where the data is encoded by using channel coding, and the data obtained after the channel coding is transmitted to the terminal device after being subject constellation modulation; and the terminal device transmits uplink data to the network device, where the uplink data may also be encoded by using the channel coding, and the encoded data is transmitted to the network device after being subject constellation modulation.

In researches of the 5G system, new radio transmission technologies and new system architectures are introduced, and new frequency spectrum resources are further explored, so that the 5G system can comprehensively exceed the LTE system in terms of a resource utilization rate, a system throughput rate, and frequency spectrum resources. In the 5G system, how to perform uplink transmission by using the unlicensed frequency spectrum is a problem that urgently needs to be resolved.

Figure 2:
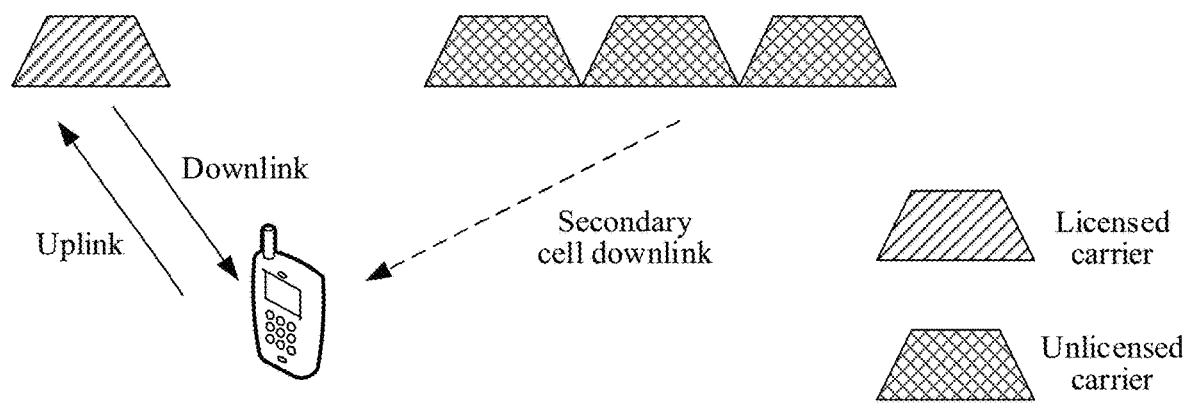
FIG. 2 is a schematic diagram of an enhanced licensed-assisted access technology.

Enhanced licensed-assisted access (eLAA) is an implementation solution of introducing the LTE system to an unlicensed frequency spectrum. As shown in FIG. 2, the eLAA implements channel bonding between a primary cell and a secondary cell in a manner of carrier aggregation (CA). The primary cell (Pcell) works on a licensed frequency band and transmits a key message and a service that needs quality of service assurance; and the secondary cell (Scell) works on an unlicensed frequency band and aims to improve actual data plane performance, and the secondary cell can simultaneously support uplink transmission and downlink transmission.

Figure 3:
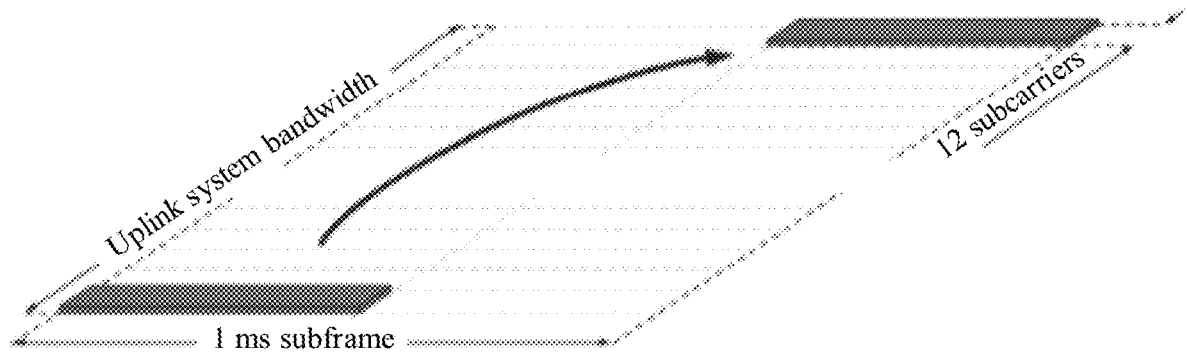
FIG. 3 is a schematic diagram of a physical uplink control channel on a frequency domain.

In the eLAA technology, a PUCCH is only transmitted on the Pcell, to be specific, transmitted on a licensed frequency spectrum (also referred to as: licensed frequency band), and is usually configured to be on an edge of an uplink system bandwidth in terms of a frequency domain, as shown in FIG. 3. One PUCCH occupies two slots (slot) in one uplink subframe (subframe), and each slot occupies 12 subcarriers, namely one resource block (RB), in a frequency domain. In a same subframe, physical resource blocks (PRB) of two consecutive slots of the PUCCH are respectively located on two ends of an available frequency spectrum resource.

To effectively utilize the resource, a plurality of UEs in a same cell may share a same RB pair to send respective PUCCHs. This is implemented through orthogonal code division multiplexing (CDM): using a cyclic shift in a frequency domain or using an orthogonal sequence in a time domain. For different PUCCH formats (format), different CDM technologies may be used.

A possible scenario in 5G is standalone networking on an unlicensed frequency band. That is, without using a licensed frequency band, all control and data signals are transmitted on the unlicensed frequency band. There may be inter-system interference, such as interference from Bluetooth or a wireless local area network (WLAN), on the unlicensed frequency spectrum. Therefore, a site that transmits data first needs to perform listen before talk (LBT), to be specific, needs to sense whether a channel is idle, to determine whether another site is transmitting data. If the channel is idle, the site can transmit data; otherwise, the site backs off for a period of time before trying again. Therefore, there is possibility that the PUCCH cannot be sent because the channel is not idle. In addition, because a current unlicensed frequency band has a relatively large available bandwidth, such as an 80/160 MHz bandwidth, when a plurality of 20 MHz bandwidths are used for CA to implement large bandwidth data transmission on the unauthorized frequency spectrum, an actual bandwidth of each transmission is flexible and changeable due to existence of LBT. Assuming that the PUCCH is transmitted only on the Pcell, if LBT of the Pcell fails, UE cannot respond to the PUCCH even if LBT of another Scell succeeds. As a result, a system latency is increased, and transmission efficiency is reduced.

In view of this, the embodiments of this application provide a transmission method and an apparatus thereof, so that uplink transmission can be implemented by using an unlicensed frequency spectrum, and transmission efficiency can be improved.

The transmission method and the apparatus thereof provided in the embodiments of this application can be applied to a scenario of communication between a network device and a terminal device on an unlicensed frequency band in a communications system such as 5G, and specifically, can be applied to a scenario of standalone networking on an unlicensed frequency band.

A transmission frequency domain resource included in the embodiments of this application is used for PUCCH information uplink transmission by the terminal device, and may be an active uplink bandwidth part (BWP), or may be another term used to describe PUCCH uplink transmission. For ease of description, in the embodiments of this application, the transmission frequency domain resource is introduced by using the BWP as an example.

A BWP includes a set of consecutive PRBs, and may be one sub-band in one single wideband carrier (single wideband carrier), or may be a bandwidth of one component carrier (CC) in carrier aggregation (CA). The sub-band may correspond to one or more carriers, or correspond to some subcarriers, some resource blocks, or the like on one carrier. A basic unit of the BWP may be 20 MHz, 40 MHz, 60 MHz, 80 MHz, or the like. This is not limited in the embodiments of this application.

The network device can configure m (m>=1) BWPs for the terminal device, and selectively activate n (n<=m) BWPs therein within a period of time. In different embodiments, BWP configurations of terminal devices may be same or different. This is not limited in this application.

The following describes the transmission method provided in the embodiments of this application in detail with reference to FIG. 4 to FIG. 8.

Figure 4:
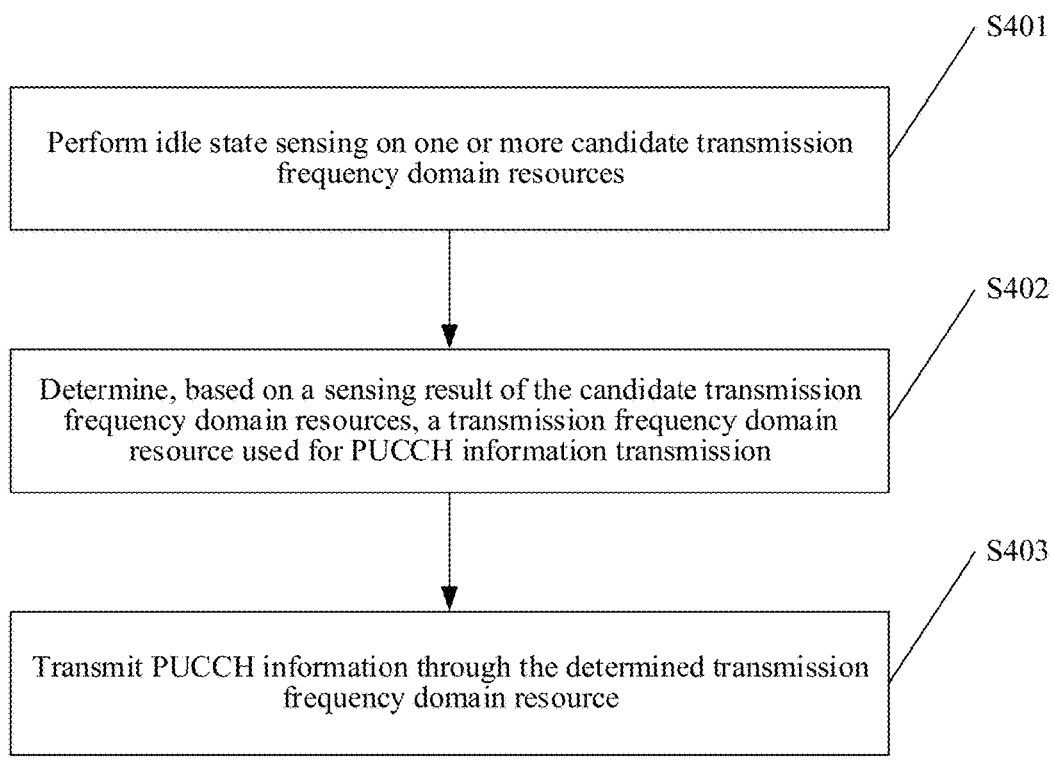
FIG. 4 is a schematic flowchart of a transmission method according to an embodiment of this application.

FIG. 4 is a schematic flowchart of a transmission method according to an embodiment of this application. The method is described from a perspective of a terminal device. The method includes, but is not limited to, the following operations.

Operation S401: Perform idle state sensing on one or more candidate transmission frequency domain resources, where the candidate transmission frequency domain resource is used for PUCCH information transmission;

The PUCCH information may be information carrying an acknowledgment (ACK) or negative acknowledgment (NACK), used to respond to a hybrid automatic repeat request (HARQ) sent by a network device; or may be information carrying a scheduling request (SR); or may be information carrying channel state information (CSI), or may be information carrying other content. The PUCCH information may alternatively be information carrying several types of the ACK/NACK, the SR, the CSI, or the other content. Content carried in specific PUCCH information is not limited in this embodiment of this application. For convenience, descriptions in embodiment of this application are provided by using the PUCCH information carrying an ACK/NACK an example.

The one or more candidate transmission frequency domain resources may be presented in a form of a set. That is, one candidate transmission frequency domain resource set includes the one or more candidate transmission frequency domain resources. The network device may configure a same candidate transmission frequency domain resource set or different candidate transmission frequency domain resource sets for different terminal devices. This is not limited in this embodiment of this application.

The candidate transmission frequency domain resource set may be a transmission frequency domain resource initially configured by the network device, where, for example, the network device initially configures m (m≥1, a positive integer) BWPs for the terminal device; or may be a transmission frequency domain resource selectively activated by the network device in a period of time, for example, n selectively activated BWPs (1≤n≤m); or may be one or more sub-bands in one BWP, where, for example, the network device configures an 80 MHz BWP for the terminal device, and the candidate transmission frequency domain resource set may include four 20 MHz sub-bands.

Specifically, the terminal device performs idle state sensing on each candidate transmission frequency domain resource, to be specific, senses which BWP is idle and can perform data transmission and which BWP is in an occupied state and cannot perform data transmission.

In one embodiment, the terminal device performs idle state sensing on each candidate transmission frequency domain resource in a manner of LBT. If a candidate transmission frequency domain resource passes LBT, it can be determined that the candidate transmission frequency domain resource is in an idle state. In another embodiment, the terminal device may perform idle state sensing on each candidate transmission frequency domain resource in another manner. A manner specifically used is not limited in this embodiment of this application. A specific implementation of LBT is not limited in this embodiment of this application.

Before the terminal device performs idle state sensing on the one or more candidate transmission frequency domain resources, the one or more candidate transmission frequency domain resources are determined.

In one embodiment, the terminal device determines, based on PUCCH resource configuration information, the one or more candidate transmission frequency domain resources used for PUCCH information transmission.

In PUCCH resource configuration, the network device configures indication information of the one or more candidate transmission frequency domain resources used to indicate the one or more candidate transmission frequency domain resources. The indication information may directly indicate the one or more candidate transmission frequency domain resources, for example, indicate an identifier or identifiers of one or more BWPs, or for another example, indicate a BWP set identifier, and the terminal device may determine the one or more candidate transmission frequency domain resources based on a correspondence between the set identifier and the included BWPs. The indication information may also indirectly indicate the one or more candidate transmission frequency domain resources.

Figure 5:
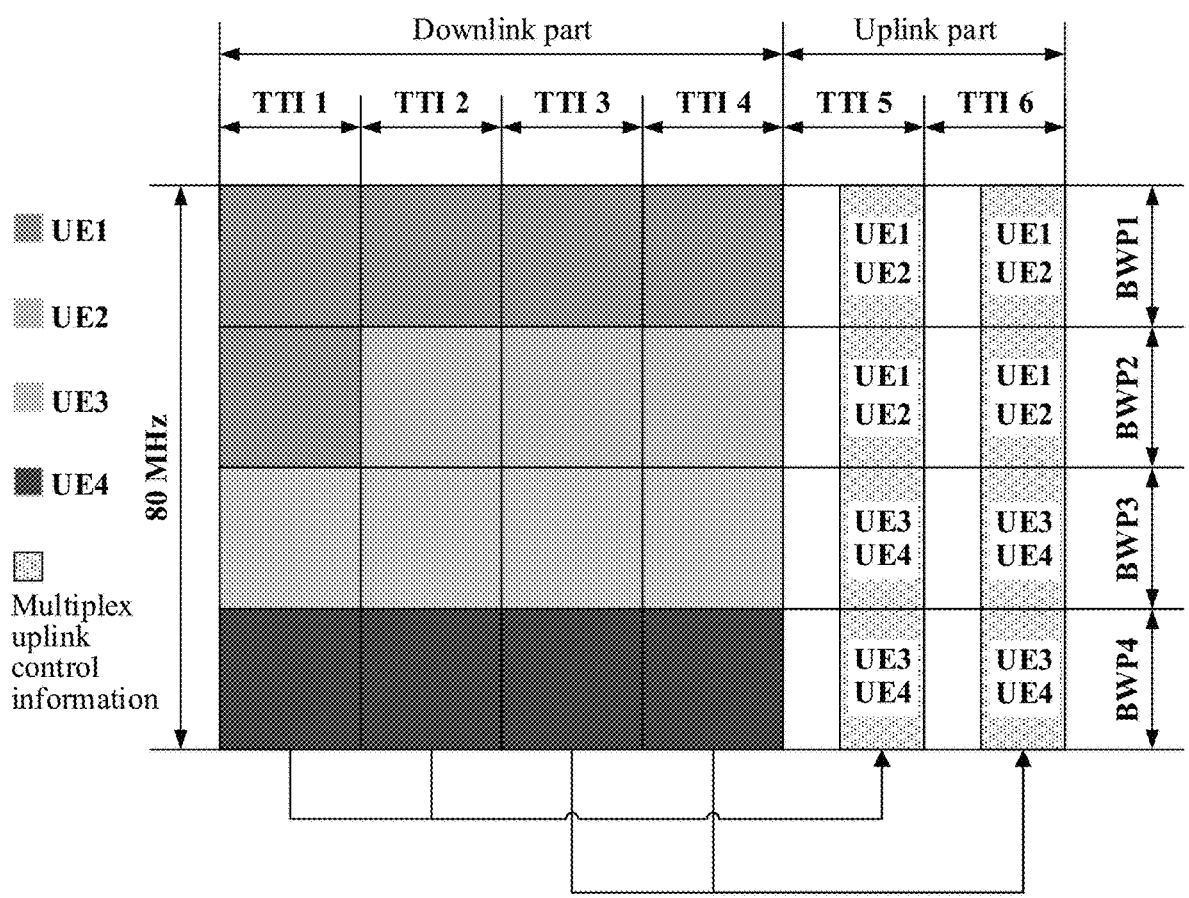
FIG. 5 is a diagram of a configuration example according to an embodiment of this application.

For example, a system bandwidth of the network device is 80 MHz, four terminal devices (UE) are respectively scheduled, four active uplink BWPs are configured for each UE, and a bandwidth of each BWP is 20 MHz. The network device configures UE1 to send PUCCH information on a BWP1 and/or a BWP2. That is, the UE1 is configured to transmit uplink PUCCH information and an uplink BWP set that includes the BWP1 and the BWP2. Similarly, the network device configures UE2 to send a PUCCH on the BWP1 and/or the BWP2; and the network device configures UE3 and UE4 to send the PUCCH on a BWP3 and/or a BWP4. Refer to FIG. 5.

In another embodiment, the PUCCH resource configuration information includes a sequence number of an uplink BWP set. A correspondence between the sequence number of the uplink BWP set and included uplink BWPs is shown in following Table 1.

TABLE 1

| Sequence number of an uplink BWP set | Uplink BWPs included in the uplink BWP set |
| --- | --- |
| 0 | BWP1 |
| 1 | BWP2 |
| 2 | BWP3 |
| 3 | BWP4 |
| 4 | BWP1, BWP2 |
| 5 | BWP1, BWP3 |
| 6 | BWP1, BWP4 |
| 7 | BWP2, BWP3 |
| 8 | BWP2, BWP4 |
| 9 | BWP3, BWP4 |
| 10 | BWP1, BWP2, BWP3 |
| 11 | BWP1, BWP2, BWP4 |
| 12 | BWP1, BWP3, BWP4 |
| 13 | BWP2, BWP3, BWP4 |
| 14 | BWP1, BWP2, BWP3, BWP4 |

It should be noted that, Table 1 is merely an example. Actually, some subsets thereof may be selected as an available configuration set. For example, the network device configures three active 20 MHz uplink BWPs of for the UE, and a correspondence between a sequence number of an uplink BWP set used for PUCCH information transmission and uplink BWPs included in the uplink BWP set is shown in following Table 2.

TABLE 2

| Sequence number of an uplink BWP set | Uplink BWPs included in the uplink BWP set |
| --- | --- |
| 0 | BWP1 |
| 1 | BWP2 |
| 2 | BWP3 |
| 3 | BWP1, BWP2 |
| 4 | BWP1, BWP3 |
| 5 | BWP2, BWP3 |
| 6 | BWP1, BWP2, BWP3 |

In another embodiment, the network device may configure more active uplink BWPs for the terminal device, such as eight active uplink BWPs. In this case, Table 2 may be further expanded. This is not limited in this embodiment of this application.

In another embodiment, the network device may configure different quantities of active uplink BWPs for different terminal devices. The network device configures three active 20 MHz uplink BWPs for the UE1, configures two active 20 MHz uplink BWPs for the UE2, and configures four active 20 MHz uplink BWPs for the UE3. This is not limited in this embodiment of this application. The active uplink BWP set configured by the network device for each terminal device may include a same uplink BWP.

The PUCCH resource configuration information, apart from being used to indicate information of the one or more candidate transmission frequency domain resources, may further include time domain information, to be specific, a location of a subframe or a slot in which the PUCCH is located and a symbol location in the subframe or slot; may further include location information of a candidate transmission frequency domain resource (a frequency domain resource location in the uplink BWP), for example, a resource interlace index (interlace index); and may further include an orthogonal extension code and the like. This is not limited in this embodiment of this application.

The location information of the candidate transmission frequency domain resource may be used to indicate which sub-band or which CC the candidate transmission frequency domain resource is. For example, assuming that a basic unit of a BWP is 20 MHz, the location information of the candidate transmission frequency domain resource may be used to indicate which sub-band in a single wideband carrier or which CC in CA the BWP is. In another embodiment, the location information of the candidate transmission frequency domain resource may alternatively be used to indicate which frequency resources in a BWP are to-be-occupied, and for example, indicate which frequency domain resources in a 20 MHz BWP are to-be-occupied.

Based on an example shown in FIG. 5, ACK/NACK information corresponding to a subframe 1 and a subframe 2 in a time domain is located at last two orthogonal frequency division multiplexing (orthogonal frequency division multiplexing, OFDM) symbols of a subframe 5, and ACK/NACK information of a subframe 3 and a subframe 4 is located at last two OFDM symbols of a subframe 6.

The PUCCH resource configuration information may be semi-statically configured by the network device in advance; or may be dynamically indicated by the network device in downlink control information sent to the terminal device, that is, be carried in the downlink control information; or may be configured in a mixed manner. This is not limited in this embodiment of this application. The downlink control information may be DCI (downlink control information) defined in an LTE system, or may be downlink control information of another name defined in a future communications system. Particularly, the foregoing indication information of the uplink BWP set may be carried in the downlink control information.

If the PUCCH resource configuration information directly indicates the one or more candidate transmission frequency domain resources, the terminal device may directly determine uplink BWPs included in the BWP set through table lookup based on the sequence number of the BWP set.

If the PUCCH resource configuration information indirectly indicates the one or more candidate transmission frequency domain resources, the terminal device may obtain by calculation a corresponding sequence number of the BWP set from a sequence number of a PUCCH resource based on a preset formula, and determine included uplink BWPs through table lookup.

In another embodiment, if the PUCCH resource configuration information further includes information in addition to information used to indicate information of the one or more candidate transmission frequency domain resources, the terminal device may further determine other information, such as time domain information, a frequency domain resource location in the uplink BWP, orthogonal extension code information, and the like, based on the PUCCH resource configuration information.

In one embodiment, the terminal device determines, based on a downlink transmission resource, the one or more candidate transmission frequency domain resources used for PUCCH information transmission.

While determining the downlink transmission resource for the terminal device, the network device determines a correspondence between the downlink transmission resource and the candidate transmission frequency domain resource set, that is, bonds the downlink transmission resource of the scheduled terminal device and the uplink BWP set. The correspondence between the downlink transmission resource and the uplink BWP set may be set by a protocol, and is known to both the network device and the terminal device, or may be set by the network device, and the correspondence between the downlink transmission resource and the uplink BWP set is notified to the terminal device in advance so that the terminal device, in a case of learning of the downlink transmission resource, may determine the uplink BWP set based on the correspondence and the downlink transmission resource.

Figure 6:
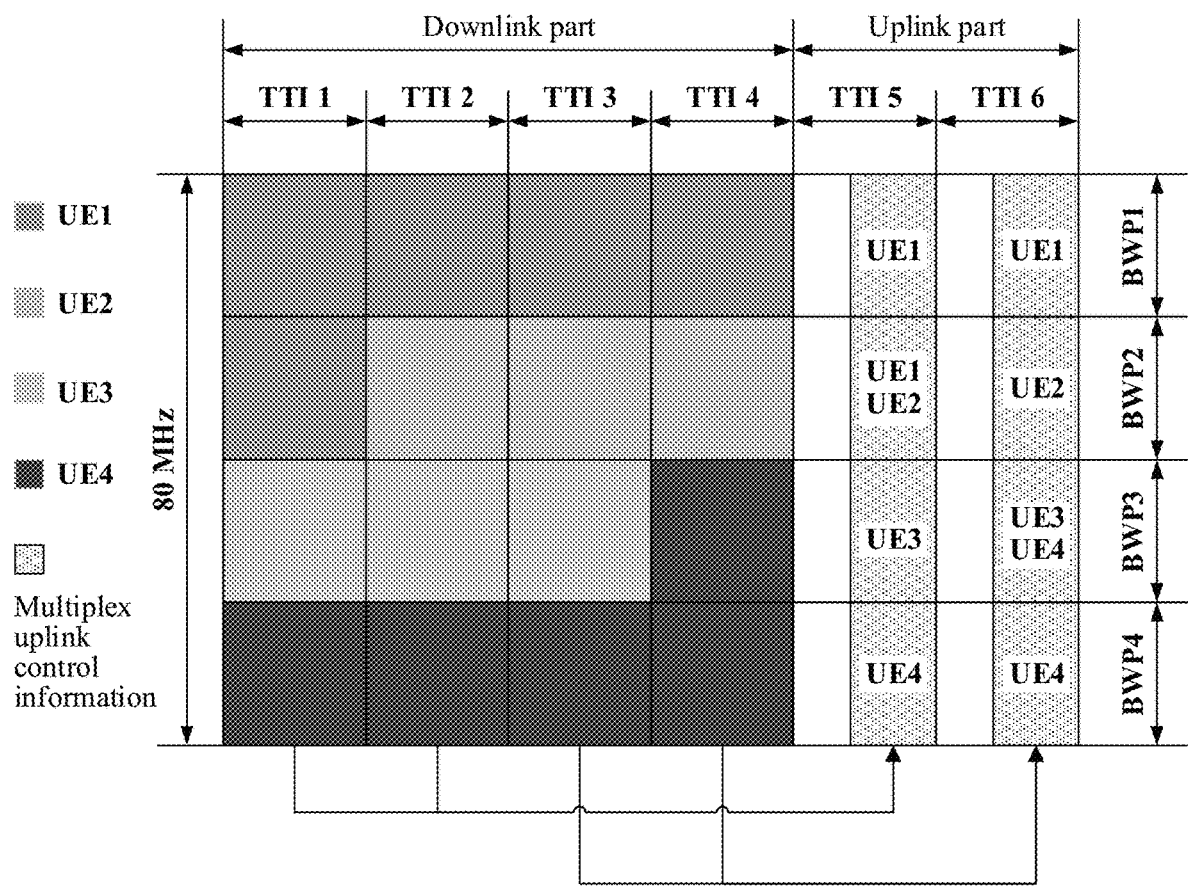
FIG. 6 is a diagram of another configuration example according to an embodiment of this application.

For example, a downlink transmission bandwidth allocated for the UE1 in the subframe 1 and the subframe 2 includes the BWP1 and the BWP2, and therefore, an uplink BWP set corresponding to the UE1 in the subframe 5 includes the BWP1 and the BWP2; and a downlink transmission bandwidth allocated for the UE1 in the subframe 3 and the subframe 4 includes only the BWP1, and therefore, an uplink BWP set corresponding to the UE1 in the subframe 6 includes only the BWP1. Similarly, an uplink BWP set corresponding to the UE 2 in the subframe 5 and the subframe 6 includes only the BWP2; an uplink BWP set corresponding to the UE 3 in both the subframe 5 and the subframe 6 includes only the BWP 3; and an uplink BWP set corresponding to the UE4 in the subframe 5 includes only the BWP 4, and an uplink BWP set corresponding to the UE4 in the subframe 6 includes the BWP 3 and the BWP 4. Refer to FIG. 6.

The terminal device determines the uplink BWP set based on the learned downlink transmission resource and the correspondence between the downlink transmission resource and the uplink BWP set, that is, determines the one or more candidate transmission frequency domain resources.

Operation S402: Determine, based on a sensing result of the candidate transmission frequency domain resources, a transmission frequency domain resource used for PUCCH information transmission.

In a process that the terminal device performs idle state sensing on the uplink BWPs included in the uplink BWP set, it is possible that some uplink BWPs are in an idle state, and some uplink BWPs are in an occupied state, or all uplink BWPs are in an idle state, or all uplink BWPs are in an occupied state, or the like.

In one embodiment, if sensing results of all the candidate transmission frequency domain resources are an occupied state, then the terminal device abandons this PUCCH information transmission.

In one embodiment, if a result of only one candidate transmission frequency domain resource in all the candidate transmission frequency domain resources is an idle state, then the terminal device determines the candidate transmission frequency domain resource in an idle state as a transmission frequency domain resource used for PUCCH information transmission.

In one embodiment, if results of at least two candidate transmission frequency domain resources in all the candidate transmission frequency domain resources are an idle state, the terminal device selects one candidate transmission frequency domain resource from the at least two candidate transmission frequency domain resources based on an identifier of the terminal device, and determines the selected candidate transmission frequency domain resource as a transmission domain resource used for PUCCH information transmission. For example, the terminal device determines, based on UE identification (identification, ID), the transmission frequency domain resource used for PUCCH information transmission in the at least two candidate transmission frequency domain resources. Assuming that the UE1 passes LBT on both the BWP1 and the BWP2, a quantity of available BWPs is 2. The UE1 performs a modulo operation on 2 with its UE ID, and if a remainder is 0, determines the BWP1 as the transmission frequency domain resource used for PUCCH information transmission; and if a remainder is 1, determines the BWP2 as the transmission frequency domain resource used for PUCCH information transmission. In another embodiment, another manner may be used for a correspondence between the remainder and the transmission frequency domain resource used for PUCCH information transmission. For example, if the remainder is 1, the BWP1 is determined as the transmission frequency domain resource used for PUCCH information transmission; and if the remainder is 0, the BWP2 is determined as the transmission frequency domain resource used for PUCCH information transmission. A specific correspondence between the remainder and the transmission frequency domain resource used for PUCCH information transmission is not limited in this embodiment of this application.

It should be noted that, the foregoing manner of performing a modulo operation and determining based on a remainder is merely an example, and is not a limitation to this embodiment of this application. In an actual application, another manner based on the UE ID may be used to determine the transmission frequency domain resource used for PUCCH information transmission.

In another embodiment, the terminal device may autonomously and randomly select one candidate transmission frequency domain resource from the at least two candidate transmission frequency domain resources based on an identifier of the terminal device, and determine the selected candidate transmission frequency domain resource as a transmission domain resource used for PUCCH information transmission.

If there are a plurality of candidate transmission frequency domain resources, the network device needs to receive the PUCCH information on all the BWPs included in the candidate transmission frequency domain resources. In a manner that the foregoing terminal device selects one candidate transmission frequency domain resource from the candidate transmission frequency domain resources, and determines the selected candidate transmission frequency domain resource as the transmission domain resource used for PUCCH information transmission, the network device needs to perform blind detection, possibly resulting in introduction of an extra latency.

In view of this, in one embodiment, the terminal device determines all candidate transmission frequency domain resources in an idle state as transmission frequency domain resources used for PUCCH information transmission. In other words, when the UE1 passes LBT on both the BWP1 and the BWP2, both the BWP1 and the BWP2 are determined as the transmission frequency domain resources used for PUCCH information transmission. The UE1 repeatedly sends the PUCCH information on the BWP1 and the BWP2, that is, the PUCCH information is sent on the BWP1, and is also sent on the BWP2.

If the PUCCH information is repeatedly sent on a plurality of BWPs, the network device does not need to perform blind detection, and may directly combine and receive the PUCCH information on all the BWPs included in the candidate transmission frequency domain resource set, so that receiving efficiency of the network device is improved. In another embodiment, the network device may still receive the PUCCH information in a blind detection manner.

Which one in the foregoing possible embodiments is implemented in an actual application may be configured by the network device for the terminal device, or prescribed by a protocol, or be set by the terminal device autonomously. Which one is specifically implemented is not limited in this embodiment of this application.

Operation S403: Transmit the PUCCH information by using the determined transmission frequency domain resource;

Specifically, the terminal device transmits the PUCCH information by using the determined transmission frequency domain resource, and for example, transmits the PUCCH information to the network device by using the determined transmission frequency domain resource.

If one transmission frequency domain resource is determined, then the PUCCH information is transmitted by using the transmission frequency domain resource; and if two or more transmission frequency domain resources are determined, then the PUCCH information is transmitted by using two or more transmission frequency domain resources.

In the embodiment depicted in FIG. 4, after determining the one or more candidate transmission frequency domain resources, the terminal device performs idle state sensing on the one or more candidate transmission frequency domain resources, determines, based on a sensing result, the transmission frequency domain resource used for PUCCH information transmission, and finally, transmits the PUCCH information by using the determined transmission frequency domain resource, so that uplink transmission can be implemented by using an unlicensed licensed frequency spectrum, and transmission efficiency can be improved.

Figure 7:
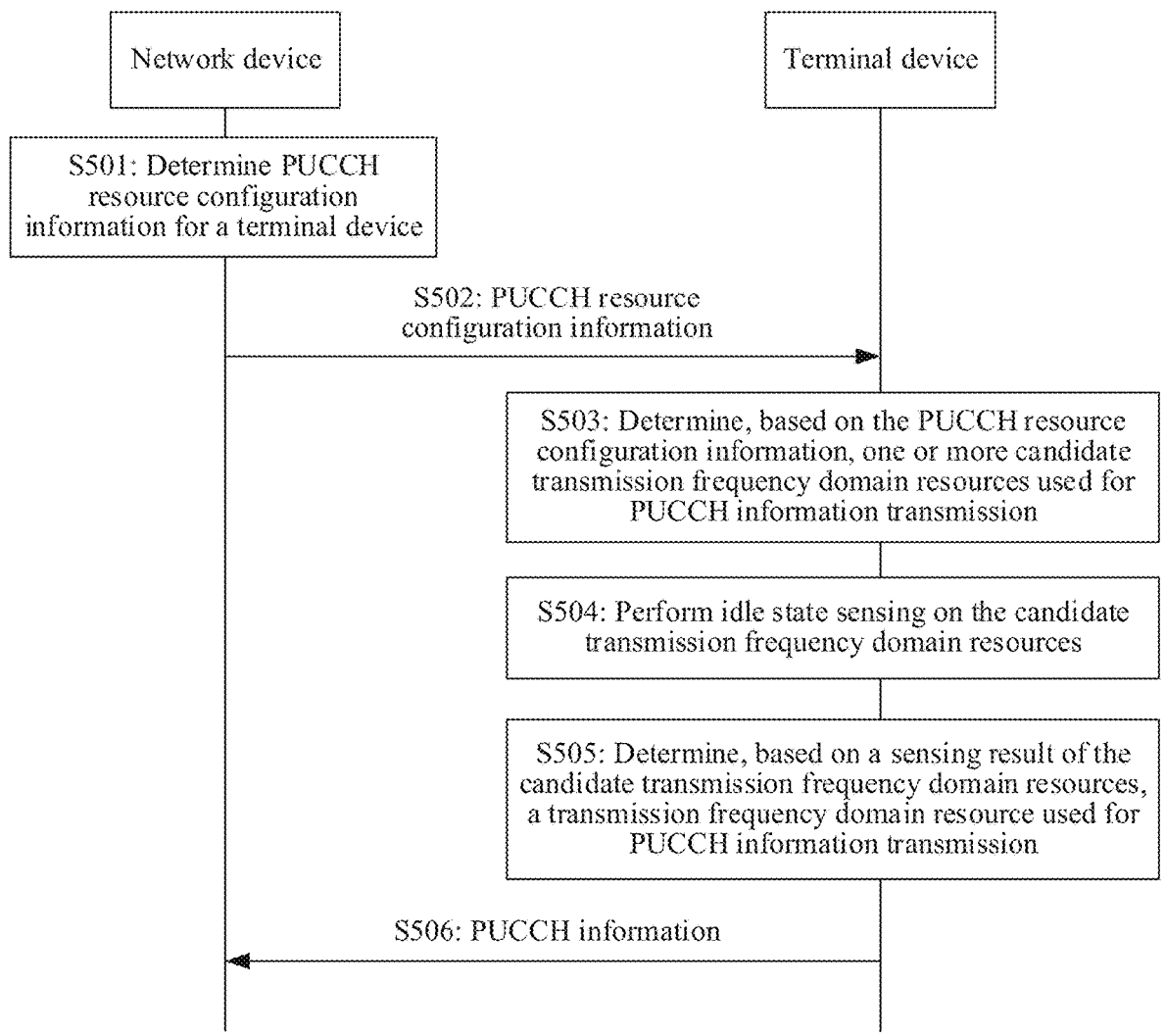
FIG. 7 is a schematic flowchart of another transmission method according to an embodiment of this application.

FIG. 7 is a schematic flowchart of another transmission method according to an embodiment of this application. A network device directly indicates one or more candidate transmission frequency domain resources by using PUCCH resource configuration information. The method is described from a perspective of interaction between a terminal device and a network device. The method may include, but is not limited to, the following operations.

Operation S501: The network device determines PUCCH resource configuration information for the terminal device.

The network device configures the PUCCH resource configuration information for the terminal device. The PUCCH resource configuration information includes information of one or more candidate transmission frequency domain resources used to indicate the one or more candidate transmission frequency domain resources. The indication information may directly indicate the one or more candidate transmission frequency domain resources, for example, indicate an identifier or identifiers of one or more BWPs, or for another example, indicate a BWP set identifier, and the terminal device may determine the one or more candidate transmission frequency domain resources based on a correspondence between the set identifier and the included BWPs. The indication information may also indirectly indicate the one or more candidate transmission frequency domain resources.

In different embodiments, the network device may configure different quantities of active uplink BWPs for different terminal devices. The network device configures three active 20 MHz uplink BWPs for a UE1, configures two active 20 MHz uplink BWPs for a UE2, and configures four active 20 MHz uplink BWPs for a UE3. This is not limited in this embodiment of this application. The active uplink BWP set configured by the network device for each terminal device may include a same uplink BWP.

The PUCCH resource configuration information, apart from being used to indicate information of the one or more candidate transmission frequency domain resources, may further include time domain information, to be specific, a location of a subframe or a slot at which the PUCCH is located and a symbol location in the subframe or the slot; may further include location information, such as an interlace index, of a candidate transmission frequency domain resource (a frequency domain resource location in the uplink BWP); and may further include an orthogonal extension code. This is not limited in this embodiment of this application.

The location information of the candidate transmission frequency domain resource may be used to indicate which sub-band or which CC the candidate transmission frequency domain resource is. For example, assuming that a basic unit of a BWP is 20 MHz, the location information of the candidate transmission frequency domain resource may be used to indicate which sub-band in a single wideband carrier or which CC in CA the BWP is. In another embodiment, the location information of the candidate transmission frequency domain resource may alternatively be used to indicate which frequency resources in a BWP are to-be-occupied, and for example, indicate which frequency domain resources in a 20 MHz BWP are to-be-occupied.

Operation S502: The network device sends the PUCCH resource configuration information to the terminal device.

The network device may send the foregoing PUCCH resource configuration information to the terminal device by using radio resource control (radio resource control, RRC) signaling; or may send the foregoing PUCCH resource configuration information to the terminal device by using downlink control information, that is, dynamically indicate the foregoing PUCCH resource configuration information by using the downlink control information; or may send the PUCCH resource configuration information to the terminal device in another manner.

Operation S503: The terminal device determines, based on the PUCCH resource configuration information, the one or more candidate transmission frequency domain resources used for PUCCH information transmission.

In one embodiment, the terminal device determines the uplink BWPs included in the uplink BWP set through table lookup based on a sequence number of the uplink BWP set.

In one embodiment, the terminal device may obtain by calculation a corresponding sequence number of the BWP set from a sequence number of a PUCCH resource based on a preset formula, and determine the uplink BWPs included in the BWP set through table lookup.

Operation S504: The terminal device performs idle state sensing on the candidate transmission frequency domain resources.

Operation S505: The terminal device determines a transmission frequency domain resource used for PUCCH information transmission based on a sensing result of the candidate transmission frequency domain resources.

Operation S506: The terminal device transmits the PUCCH information to the network device by using the determined transmission frequency domain resource.

For a specific implementation process of operation S504 to operation S506 in the embodiment shown in FIG. 7, refer to operation S401 to operation S403 in the embodiment shown in FIG. 4. Details are not described herein again.

In the embodiment depicted in FIG. 7, the terminal device determines the one or more candidate transmission frequency domain resources used for PUCCH information transmission based on the PUCCH resource configuration information, so that uplink transmission can be implemented by using an unlicensed frequency spectrum, and transmission efficiency can be improved.

Figure 8:
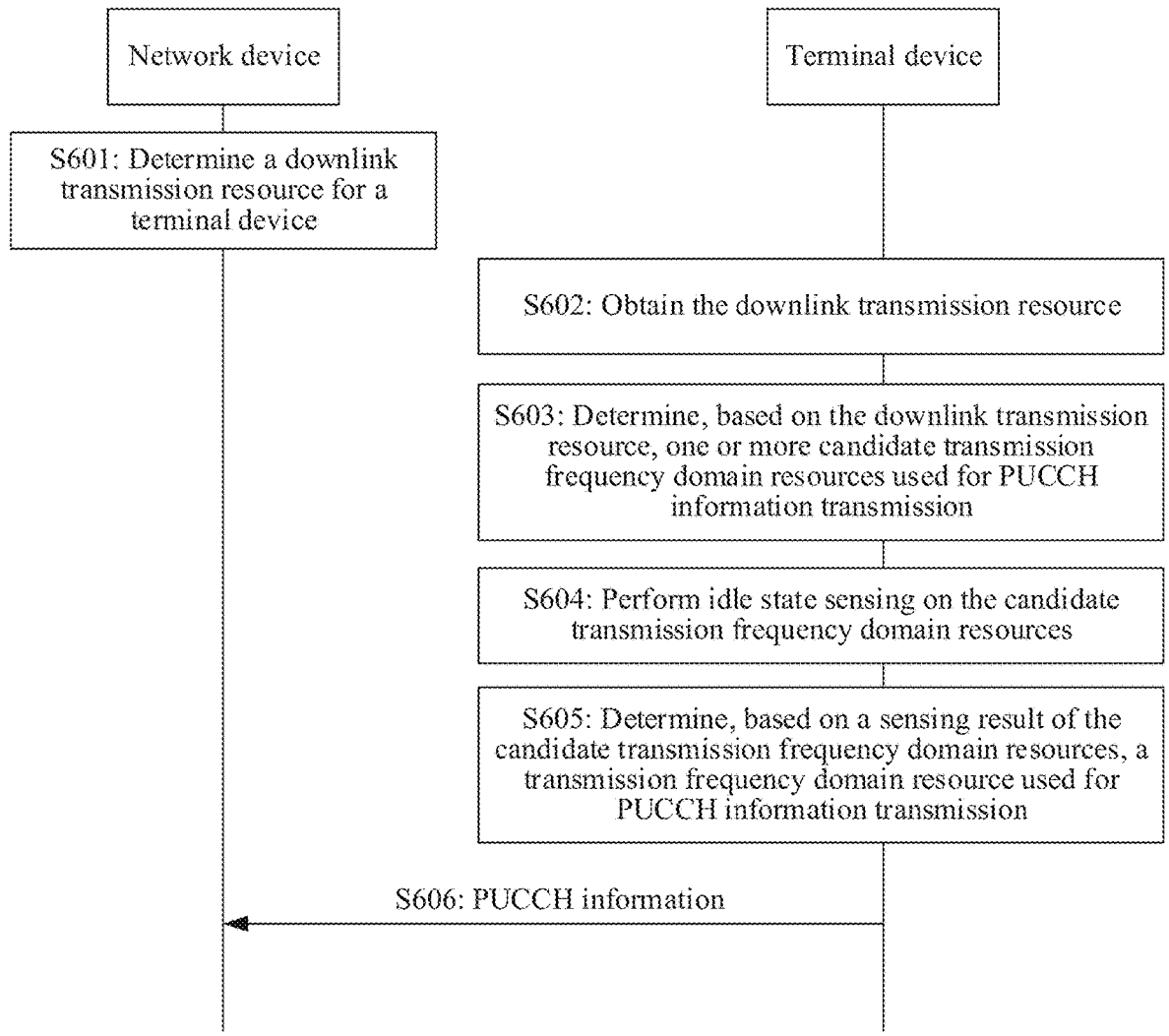
FIG. 8 is a schematic flowchart of still another transmission method according to an embodiment of this application.

FIG. 8 is a schematic flowchart of still another transmission method according to an embodiment of this application. A network device directly indicates one or more candidate transmission frequency domain resources by using a correspondence between a downlink transmission resource and an uplink BWP set. The method is described from a perspective of interaction between a terminal device and a network device. The method may include, but is not limited to, the following operations.

Operation S601: The network device determines a downlink transmission resource dedicated for the terminal device.

In one embodiment, the network device allocates downlink transmission bandwidths for all uplink transmission subframes of the terminal device. For example, in FIG. 6, downlink transmission bandwidths allocated to a subframe 1 and a subframe 2 of UE1 include a BWP1 and a BWP2.

In another embodiment, the network device may configure a correspondence between the downlink transmission resource and the uplink BWP set. To be specific, one downlink transmission resource corresponds to one uplink BWP set. The correspondence between the downlink transmission resource and the uplink BWP set may also be set by a protocol.

Operation S602: The terminal device obtains the downlink transmission resource.

In this embodiment, the terminal device may obtain the downlink transmission resource based on downlink transmission resource configuration information sent by the network device. For example, the terminal device may receive the downlink transmission resource from the network device.

In another embodiment, the terminal device obtains the correspondence between the downlink transmission resource and the uplink BWP set from the network device or based on a protocol.

Operation S603: The terminal device determines, based on the downlink transmission resource, one or more candidate transmission frequency domain resources used for PUCCH information transmission.

The terminal device determines, based on the obtained downlink transmission resource and the correspondence between the downlink transmission resource and the uplink BWP set, the one or more candidate transmission frequency domain resources used for PUCCH information transmission.

Operation S604: The terminal device performs idle state sensing on the candidate transmission frequency domain resources.

Operation S605: The terminal device determines, based on a sensing result of the candidate transmission frequency domain resources, a transmission frequency domain resource used for PUCCH information transmission.

Operation S606: The terminal device transmits the PUCCH information to the network device by using the determined transmission frequency domain resource.

For a specific implementation process of operation S604 to operation S606 in the embodiment shown in FIG. 8, refer to operation S401 to operation S403 in the embodiment shown in FIG. 4. Details are not described herein again.

In the embodiment depicted in FIG. 8, the terminal device determines, based on the downlink transmission resource and a bonding relationship between the downlink transmission resource and the uplink BWP set, the one or more candidate transmission frequency domain resources used for PUCCH information transmission, so that uplink transmission can be implemented by using an unlicensed frequency spectrum, and transmission efficiency can be improved.

It should be noted that, in the embodiment corresponding to FIG. 7 and the embodiment corresponding to FIG. 8, illustrative descriptions are provided respectively in a manner of direct indication and a manner of indirect indication. Whether the network device uses a manner of direct indication or a manner of indirect indication is limited in none of the embodiments of this application.

Figure 9:
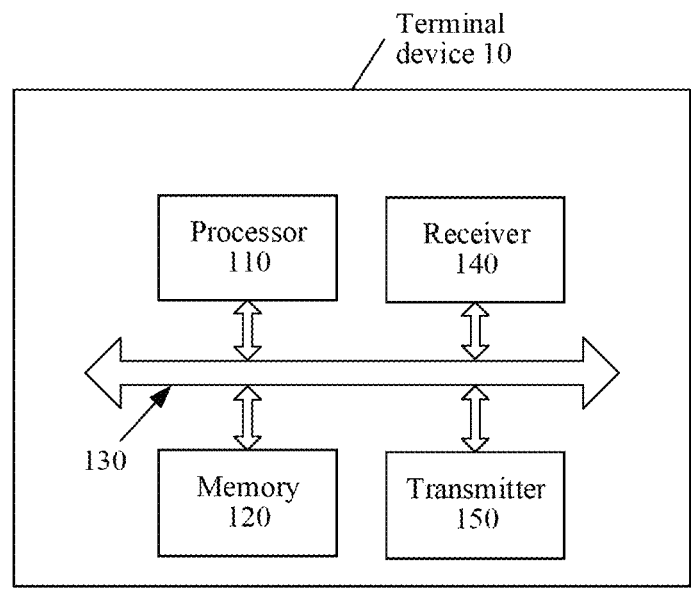
FIG. 9 is a simplified schematic diagram 1 of a device according to an embodiment of this application.

According to the foregoing methods, FIG. 9 is a simplified schematic diagram 1 of a device according to an embodiment of this application. As shown in FIG. 9, the device may be a terminal device 10, or may be a chip or a circuit, for example, a chip or a circuit that may be disposed in a terminal device. The terminal device 10 may correspond to the terminal device in the foregoing methods.

The device may include a processor 110 and a memory 120. The memory 120 is configured to store an instruction. The processor 110 is configured to execute the instruction stored in the memory 120, to implement operation S401 and operation S402 in the method corresponding to FIG. 4; operation S503 and operation S504 in the method corresponding to FIG. 7; and operation S602 to operation S604 in the method corresponding to FIG. 8.

Further, the device may further include a receiver 140 and a transmitter 150. Further, the device may further include a bus system 130. The processor 110, the memory 120, the receiver 140, and the transmitter 150 may be connected through the bus system 130.

The processor 110 is configured to execute an instruction stored in the memory 120, to control the receiver 140 to receive a signal and control the transmitter 150 to send a signal, to complete the operations of the terminal device in the foregoing methods. The receiver 140 and the transmitter 150 may be a same physical entity or different physical entities. If being a same physical entity, the receiver 140 and the transmitter 150 may be collectively referred to as a transceiver. The memory 220 may be integrated in the processor 210, or may be disposed separately from the processor 210.

In an embodiment, it may be considered to implement functions of the receiver 140 and the transmitter 150 by using a transceiver circuit or a dedicated transceiver chip. It may be considered to implement the processor 110 by using a dedicated processing chip, a processing circuit, a processor, or a general-purpose chip.

In another embodiment, it may be considered to implement the terminal device provided in this embodiment of this application in a manner of using a general-purpose computer. That is, program code for implementing the functions of the processor 110, the receiver 140, and the transmitter 150 is stored in a memory, and a general-purpose processor implements the functions of the processor 110, the receiver 140, and the transmitter 150 by executing the code stored in the memory.

For explanations and detailed descriptions of concepts related to the device and related to technical solutions provided in the embodiments of this application, refer to the foregoing methods or descriptions about the content in other embodiments. Details are not described herein again.

Figure 10:
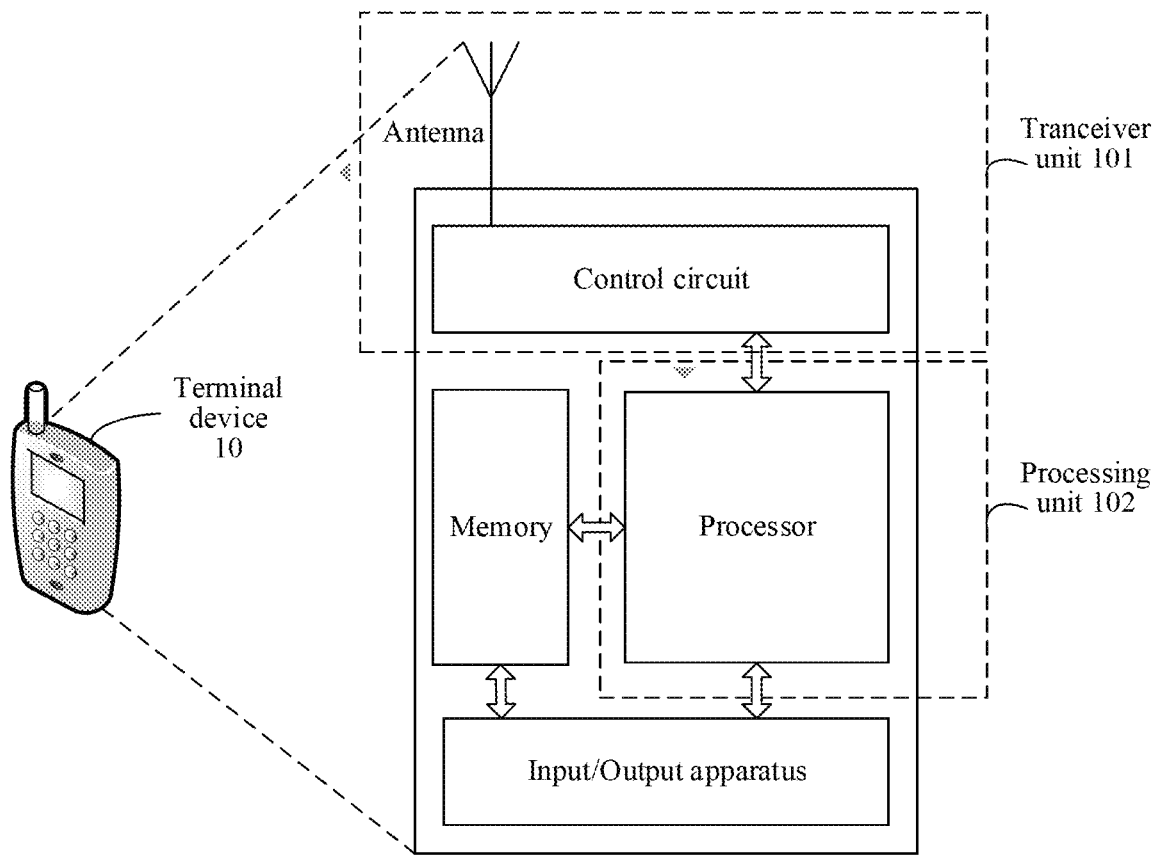
FIG. 10 is a simplified schematic structural diagram of a terminal device according to an embodiment of this application.

FIG. 10 is a simplified schematic structural diagram of a terminal device according to an embodiment of this application. The terminal device may be applied to the system shown in FIG. 1. For ease of description, FIG. 10 shows only main components of the terminal device. As shown in FIG. 10, the terminal device 10 includes: a processor, a memory, a control circuit, an antenna, and an input/output apparatus. The processor is mainly configured to: process a communications protocol and communication data, control the entire terminal device, execute a software program, and process data of the software program, for example, is configured to support the terminal device to perform an action described in the foregoing method embodiments. The memory is mainly configured to store the software program and data. The control circuit is mainly configured to: convert a baseband signal and a radio frequency signal, and process the radio frequency signal. The control circuit together with the antenna may also be referred to as a transceiver, and is mainly configured to receive and send a radio frequency signal in an electromagnetic wave form. The input/output apparatus, such as a touchscreen, a display, or a keyboard, is mainly configured to: receive data entered by a user and output data to the user.

After the terminal device is powered on, the processor may read the software program stored in a storage unit, explain and execute an instruction of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends the radio frequency signal in a form of electromagnetic wave by using the antenna. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 10 shows only one memory and one processor. In an actual terminal device, there may be a plurality of processors and a plurality of memories. The memory may also be referred to as a storage medium, a storage device, or the like. This is not limited in this embodiment of this application.

In one embodiment, the processor may include a baseband processor and a central processing unit. The baseband processor is mainly configured to process a communications protocol and communication data. The central processing unit is mainly configured to control the entire terminal device, execute a software program, and process data of the software program. The processor in FIG. 10 integrates functions of the baseband processor and the central processing unit. A person skilled in the art may understand that the baseband processor and the central processing unit may be respectively independent processors, and are interconnected by using technologies such as a bus. A person skilled in the art may understand that the terminal device may include a plurality of baseband processors, to adapt to different network standards. The terminal device may include a plurality of central processing units, to enhance a processing capability of the terminal device. Components of the terminal device may be connected to each other through various buses. The baseband processor may also be presented as a baseband processing circuit or a baseband processing chip. The central processing unit may also be presented as a central processing circuit or a central processing chip. A function of processing the communications protocol and the communication data may be built in the processor, or may be stored in the storage unit in a software program form. The processor executes the software program, to implement a baseband processing function.

Exemplarily, in this embodiment of this application, the antenna having a receiving and transmitting function and the control circuit may be regarded as a transceiver unit 101 of the terminal device 10. The processor having a processing function may be regarded as a processing unit 102 of the terminal device 10. As shown in FIG. 10, the terminal 10 includes a transceiver unit 101 and a processing unit 102. The transceiver unit may also be referred to as a transceiver, a transceiver device, a transceiver apparatus, and the like. In one embodiment, a component configured to implement a receiving function in the transceiver unit 101 may be regarded as a receiving unit, and a component configured to implement a sending function in the transceiver unit 101 may be regarded as a sending unit. That is, the transceiver unit 101 includes the receiving unit and the sending unit. For example, the receiving unit may also be referred to as a receiving device, a receiver, a receiving circuit, or the like. The sending unit may be referred to as a transmitting device, a transmitter, a transmitting circuit, or the like.

Figure 11:
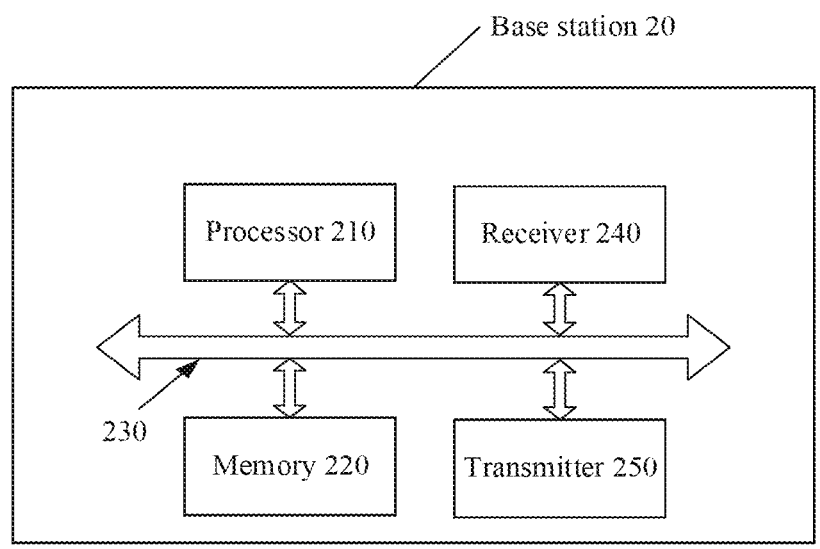
FIG. 11 is a simplified schematic diagram 2 of a device according to an embodiment of this application.

According to the foregoing methods, FIG. 11 is a simplified schematic diagram 2 of a device according to an embodiment of this application. As shown in FIG. 11, the device may be a network device 20, or may be a chip or a circuit, such as a chip or a circuit that may be disposed in a network device. The network device 20 corresponds to the network device in the foregoing methods. The device may include a processor 210 and a memory 220. The memory 220 is configured to store an instruction. The processor 210 is configured to execute the instruction stored in the memory 220, to implement operation S501 in the method corresponding to FIG. 7; and operation S601 in the method corresponding to FIG. 8.

Further, the network may further include a receiver 240 and a transmitter 250. Further, the network may further include a bus system 230.

The processor 210, the memory 220, the receiver 240, and the transmitter 250 are connected through the bus system 230. The processor 210 is configured to execute the instruction stored in the memory 220, to control the receiver 240 to receive a signal and control the transmitter 250 to send the signal, to complete the operations of the network device in the foregoing methods. The receiver 240 and the transmitter 250 may be a same physical entity or different physical entities. If being a same physical entity, the receiver 140 and the transmitter 150 may be collectively referred to as a transceiver. The memory 220 may be integrated in the processor 210 or may be disposed separately from the processor 210.

In an embodiment, it may be considered to implement functions of the receiver 240 and the transmitter 250 by using a transceiver circuit or a dedicated transceiver chip. It may be considered to implement the processor 210 by using a dedicated processing chip, a processing circuit, a processor, or a general-purpose chip.

In another embodiment, it may be considered to implement the network device provided in this embodiment of this application in a manner of using a general-purpose computer. That is, program code for implementing the functions of the processor 210, the receiver 240, and the transmitter 250 is stored in a memory, and a general-purpose processor implements the functions of the processor 210, the receiver 240, and the transmitter 250 by executing the code stored in the memory.

For explanations and detailed descriptions of concepts related to the device and related to technical solutions provided in the embodiments of this application, refer to the foregoing methods or descriptions about the content in other embodiments. Details are not described herein again.

Figure 12:
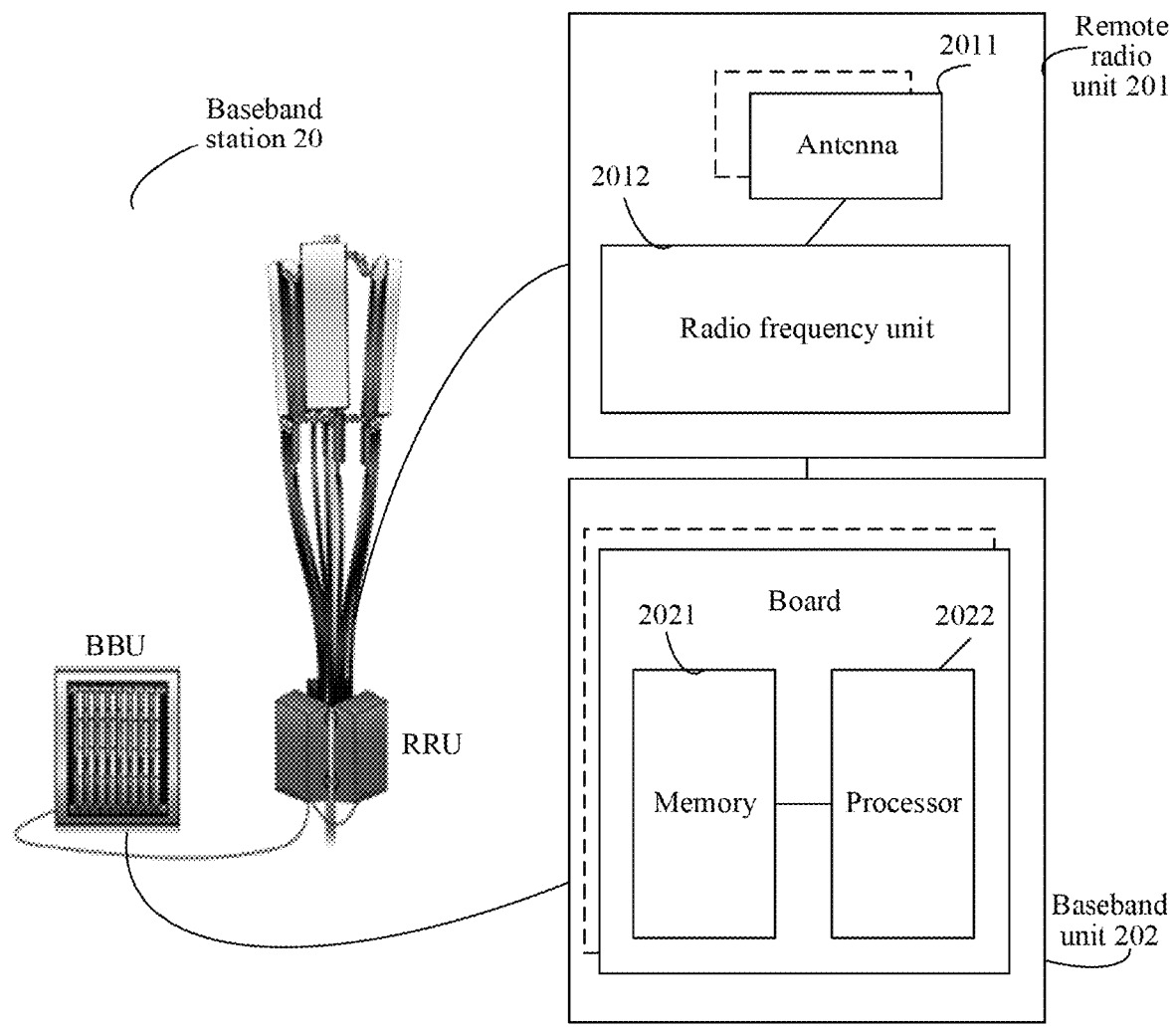
FIG. 12 is a simplified schematic structural diagram of a network device according to an embodiment of this application.

According to the foregoing methods, FIG. 12 is a simplified schematic structural diagram of a network device according to an embodiment of this application, and for example, may be a schematic structural diagram of a base station. As shown in FIG. 12, the base station may be applied to the system shown in FIG. 1. The base station 20 includes one or more radio frequency units, such as a remote radio unit (remote radio unit, RRU) 201 and one or more baseband units (baseband unit, BBU) (also referred to as digital unit, digital unit, DU) 202. The RRU 201 may be referred to as a transceiver unit, a transceiver device, a transceiver circuit, a transceiver, or the like, and may include at least one antenna 2011 and a radio frequency unit 2012. The RRU 201 is mainly configured to: receive and send radio frequency signals and convert a radio frequency signal and a baseband signal, and for example, is configured to send the signaling message described in the foregoing embodiment to a terminal device. The BBU 202 is mainly configured to perform baseband processing, control the base station, and the like. The RRU 201 and the BBU 202 may be physically disposed together, or may be physically separately disposed, that is, distributed base stations.

The BBU 202 is a control center of the base station, and is also referred to as a processing unit, mainly configured to implement a baseband processing function such as channel coding, multiplexing, modulation, and spectrum spreading. For example, the BBU (the processing unit) may be configured to control the base station to perform an operation procedure related to the network device in the foregoing embodiments of the methods.

In an example, the BBU 202 may include one or more boards. A plurality of boards may jointly support a radio access network (for example, an LTE network) of a single access standard, or may respectively support radio access networks of different access standards. The BBU 202 further includes a memory 2021 and a processor 2022. The memory 2021 is configured to store a necessary instruction and necessary data. For example, the memory 2021 stores preset information, a codebook, and the like in the foregoing embodiments. The processor 2022 is configured to control the base station to perform a necessary action, and for example, is configured to control the base station to perform an operation procedure related to a network device in the foregoing embodiments of the methods. The memory 2021 and the processor 2022 may serve one or more boards. That is, the memory and the processor may be disposed individually on each board. Alternatively, a plurality of boards may share the same memory and the same processor. In addition, a necessary circuit may be disposed on each board.

According to the embodiments of this application, an embodiment of this application further provides a communications system, including the foregoing network device and one or more terminal devices.

It should be understood that in the embodiment of this application, the processor may be a central processing unit (Central Processing Unit, "CPU" for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory may include a read-only memory and a random access memory, and provide an instruction and data to the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, operations in the foregoing methods can be implemented by using a hardware integrated logical circuit in the processor, or by using instructions in a form of software. The operations of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the operations in the foregoing methods in combination with hardware of the processor. To avoid repetition, details are not described herein again.

It should be further understood that, the first, second, third, fourth, and various numbers included in this specification are merely distinguished for convenient description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with illustrative logical blocks (illustrative logical block) described in the embodiments disclosed in this specification and operations (operation) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disk, DVD)), a semiconductor medium (for example, a solid-state drive (Solid State Disk, SSD)), or the like.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission method, comprising:
   performing, by a terminal device, idle state sensing on one or more candidate transmission frequency domain resources, wherein the one or more candidate transmission frequency domain resources are configured for physical uplink control channel (PUCCH) information transmission on a physical uplink control channel, wherein the one or more candidate transmission frequency domain resources are determined based on PUCCH resource configuration information that includes an identifier mapped to m bandwidth parts of n available bandwidth parts within a period of time, wherein the m bandwidth parts are selectively activated by a network device to be used as the one or more candidate transmission frequency domain resources for the terminal device to perform uplink transmissions, wherein m is greater than 1, m is less than n, and m and n are both positive integer values;
   determining, by the terminal device based on a sensing result of the one or more candidate transmission frequency domain resources, a transmission frequency domain resource from the one or more candidate transmission frequency domain resources for PUCCH information transmission, comprising:
      in response to sensing that at least two candidate transmission frequency domain resources from the one or more candidate transmission frequency domain resources are in an idle state, selecting, by the terminal device, one candidate transmission frequency domain resource from the at least two candidate transmission frequency domain resources based on an identifier of the terminal device, and determining the selected candidate transmission frequency domain resource as a transmission domain resource for PUCCH information transmission; and
   transmitting, by the terminal device, the PUCCH information by using the determined transmission frequency domain resource.

2. The method according to claim 1, further comprising:
   determining, by the terminal device, the one or more candidate transmission frequency domain resources.

3. The method according to claim 2, wherein determining, by the terminal device, the one or more candidate transmission frequency domain resources comprises:
   determining, by the terminal device, the one or more candidate transmission frequency domain resources based on the PUCCH resource configuration information, wherein the PUCCH resource configuration information is used to indicate the one or more candidate transmission frequency domain resources.

4. The method according to claim 2, wherein determining, by the terminal device, the one or more candidate transmission frequency domain resources comprises:
   determining, by the terminal device, the one or more candidate transmission frequency domain resources based on a downlink transmission resource.

5. The method according to claim 1, wherein the determining, by the terminal device based on the sensing result of the candidate transmission frequency domain resources, the transmission frequency domain resource from the one or more candidate transmission frequency domain resources for PUCCH information transmission further comprises:

in response to sensing that one candidate transmission frequency domain resource from the one or more candidate transmission frequency domain resources is in an idle state, determining, by the terminal device, the one candidate transmission frequency domain resource as a transmission frequency domain resource for PUCCH information transmission.

6. The method according to claim 1, wherein the determining, by the terminal device based on the sensing result of the candidate transmission frequency domain resources, the transmission frequency domain resource from the one or more candidate transmission frequency domain resources for PUCCH information transmission further comprises:
determining, by the terminal device, all candidate transmission frequency domain resources in an idle state as transmission frequency domain resources for PUCCH information transmission.

7. A terminal device, comprising a processor and a transceiver, wherein
the processor is configured to perform idle state sensing on one or more candidate transmission frequency domain resources, wherein the one or more candidate transmission frequency domain resources are configured for physical uplink control channel (PUCCH) information transmission, wherein the one or more candidate transmission frequency domain resources are determined based on PUCCH resource configuration information that includes an identifier mapped to m bandwidth parts of n available bandwidth parts within a period of time, wherein the m bandwidth parts are selectively activated by a network device to be used as the one or more candidate transmission frequency domain resources for the terminal device to perform uplink transmissions, wherein m is greater than 1, m is less than n, and m and n are both positive integer values;
the processor is further configured to determine, based on a sensing result of the candidate transmission frequency domain resources, a transmission frequency domain resource from the one or more candidate transmission frequency domain resources for PUCCH information transmission, wherein, in response to sensing that at least two candidate transmission frequency domain resources from the one or more candidate transmission frequency domain resources are in an idle state, the processor is configured to select one candidate transmission frequency domain resource from the at least two candidate transmission frequency domain resources based on an identifier of the terminal device, and determine the selected candidate transmission frequency domain resource as a transmission domain resource for PUCCH information transmission; and
the transceiver is configured to transmit the PUCCH information by using the determined transmission frequency domain resource.

8. The terminal device according to claim 7, wherein the processor is further configured to determine the one or more candidate transmission frequency domain resources.

9. The terminal device according to claim 8, wherein when being configured to determine the one or more candidate transmission frequency domain resources, the processor is configured to determine the one or more candidate transmission frequency domain resources based on the PUCCH resource configuration information, wherein the PUCCH resource configuration information is used to indicate the one or more candidate transmission frequency domain resources.

10. The terminal device according to claim 8, wherein when being configured determine the one or more candidate transmission frequency domain resources, the processor is further configured to determine the one or more candidate transmission frequency domain resources based on a downlink transmission resource.

11. The terminal device according to claim 7, wherein when being configured to determine, based on the sensing result of the one or more candidate transmission frequency domain resources, the transmission frequency domain resource from the one or more candidate transmission frequency domain resources for PUCCH information transmission, the processor is further configured to: in response to sensing that one candidate transmission frequency domain resource is in an idle state, determine the one candidate transmission frequency domain resource from the one or more candidate transmission frequency domain resources as a transmission frequency domain resource used for PUCCH information transmission.

12. The terminal device according to claim 7, wherein when being configured to determine, based on the sensing result of the one or more candidate transmission frequency domain resources, the transmission frequency domain resource from the one or more candidate transmission frequency domain resources for PUCCH information transmission, the processor is further configured to determine all candidate transmission frequency domain resources in an idle state as the transmission frequency domain resources for PUCCH information transmission.

13. A non-transitory machine-readable medium having instructions stored therein, which when executed by a processor of a terminal device, cause the processor to perform operations, the operations comprising:
performing idle state sensing on one or more candidate transmission frequency domain resources, wherein the one or more candidate transmission frequency domain resources are configured for physical uplink control channel (PUCCH) information transmission on a physical uplink control channel, wherein the one or more candidate transmission frequency domain resources are determined based on PUCCH resource configuration information that includes an identifier mapped to m bandwidth parts of n available bandwidth parts within a period of time, wherein the m bandwidth parts are selectively activated by a network device to be used as the one or more candidate transmission frequency domain resources for the terminal device to perform uplink transmissions, wherein m is greater than 1, m is less than n, and m and n are both positive integer values;
determining, based on a sensing result of the one or more candidate transmission frequency domain resources, a transmission frequency domain resource from the one or more candidate transmission frequency domain resources for PUCCH information transmission, comprising:
in response to sensing that at least two candidate transmission frequency domain resources from the one or more candidate transmission frequency domain resources are in an idle state, selecting, by the terminal device, one candidate transmission frequency domain resource from the at least two candidate transmission frequency domain resources based on an identifier of the terminal device, and determining the selected candidate transmission frequency domain resource as a transmission domain resource for PUCCH information transmission; and transmitting the PUCCH information by using the determined transmission frequency domain resource.

14. The machine-readable medium according to claim 13, wherein the operations further comprise:
   determining the one or more candidate transmission frequency domain resources.

15. The machine-readable medium according to claim 14, wherein determining the one or more candidate transmission frequency domain resources comprises:
   determining the one or more candidate transmission frequency domain resources based on the PUCCH resource configuration information, wherein the PUCCH resource configuration information is used to indicate the one or more candidate transmission frequency domain resources.

16. The machine-readable medium according to claim 14, wherein determining the one or more candidate transmission frequency domain resources comprises:
   determining the one or more candidate transmission frequency domain resources based on a downlink transmission resource.

17. The machine-readable medium according to claim 13, wherein the determining, based on the sensing result of the candidate transmission frequency domain resources, the transmission frequency domain resource from the one or more candidate transmission frequency domain resources for PUCCH information transmission further comprises:
   in response to sensing that one candidate transmission frequency domain resource from the one or more candidate transmission frequency domain resources is in an idle state, determining the one candidate transmission frequency domain resource as a transmission frequency domain resource for PUCCH information transmission.

* * * * *

UNITED STATES PATENT AND TRADEMARK OFFICE
CERTIFICATE OF CORRECTION

| | |
|---|---|
| PATENT NO. | : 11,606,776 B2 |
| APPLICATION NO. | : 16/746507 |
| DATED | : March 14, 2023 |
| INVENTOR(S) | : Jun Zhu, Qiong Jia and Weiwei Fan |

It is certified that error appears in the above-identified patent and that said Letters Patent is hereby corrected as shown below:

On the Title Page

Below the Related U.S. Application Data section, insert:
--Foreign Application Priority Data
Jul. 18, 2017 (CN) .................. 201710586542.5--.

Signed and Sealed this
Eighteenth Day of April, 2023

Katherine Kelly Vidal
*Director of the United States Patent and Trademark Office*